(12) United States Patent
Smith et al.

(10) Patent No.: US 10,778,629 B2
(45) Date of Patent: Sep. 15, 2020

(54) SYSTEMS AND METHODS FOR COLLATION, TRANSLATION, AND ANALYSIS OF PASSIVELY CREATED DIGITAL INTERACTION AND RELATIONSHIP DATA

(71) Applicant: SAP SE, Walldorf (DE)

(72) Inventors: Ray Smith, Dublin (IE); Connor Murphy, Dublin (IE)

(73) Assignee: SAP SE, Walldorf (DE)

( * ) Notice: Subject to any disclaimer, the term of this patent is extended or adjusted under 35 U.S.C. 154(b) by 155 days.

(21) Appl. No.: 15/925,468

(22) Filed: Mar. 19, 2018

(65) Prior Publication Data

US 2018/0212911 A1 Jul. 26, 2018

Related U.S. Application Data

(60) Division of application No. 14/606,990, filed on Jan. 27, 2015, now Pat. No. 9,923,852, which is a
(Continued)

(51) Int. Cl.
*G06F 15/16* (2006.01)
*H04L 12/58* (2006.01)
(Continued)

(52) U.S. Cl.
CPC ............ *H04L 51/16* (2013.01); *G06F 16/248* (2019.01); *G06Q 10/107* (2013.01); *H04L 67/22* (2013.01)

(58) Field of Classification Search
CPC ... H04L 63/08; H04L 63/0876; H04L 63/123; H04L 63/166; H04L 63/205; H04L 63/308; H04L 63/1416; H04L 63/1441; H04L 12/58; H04L 12/585; H04L 12/589; H04L 12/2495; H04L 12/5885; H04L 67/10; H04L 67/125; H04L 41/026; H04L 41/5093
(Continued)

(56) References Cited

U.S. PATENT DOCUMENTS

2007/0027919 A1 2/2007 Mastel
2009/0319514 A1 12/2009 Gouttas et al.
(Continued)

*Primary Examiner* — Farzana B Huq
(74) *Attorney, Agent, or Firm* — Buckley, Maschoff & Talwalkar LLC

(57) ABSTRACT

A method of modeling relationships between e-mail users. The method includes extracting a record of e-mail exchanges between the users. The record is extracted from at least one of an e-mail server and an e-mail transfer agent. The data is extracted through a direct internet access protocol. The method includes filtering the record to produce relevant interaction data based on the e-mail exchanges between two users. Relevant interaction data includes a number of e-mail exchanges between the users and includes a ratio of source to target and target to source interactions. The method includes loading the relevant interaction data into a relationship modeling program, which assigns a weight to each of a plurality of characteristics of the relevant interaction data and provides a model of relationships between the e-mail users based at least in part on the weight of each characteristic. The plurality of characteristics comprises interaction volume.

21 Claims, 3 Drawing Sheets

Related U.S. Application Data continuation of application No. 13/282,312, filed on Oct. 26, 2011, now Pat. No. 8,943,151.

(60) Provisional application No. 61/406,973, filed on Oct. 26, 2010.

(51) Int. Cl.
*G06F 16/248* (2019.01)
*G06Q 10/10* (2012.01)
*H04L 29/08* (2006.01)

(58) Field of Classification Search
USPC .............. 709/204–207, 224–225, 248, 246
See application file for complete search history.

(56) References Cited

U.S. PATENT DOCUMENTS

| | | | |
|---|---|---|---|
| 2010/0153175 A1* | 6/2010 | Pearson | G06Q 10/10 705/319 |
| 2010/0211641 A1* | 8/2010 | Yih | G06O 10/107 709/206 |
| 2012/0054271 A1 | 3/2012 | Leroy et al. | |

* cited by examiner

SYSTEMS AND METHODS FOR COLLATION, TRANSLATION, AND ANALYSIS OF PASSIVELY CREATED DIGITAL INTERACTION AND RELATIONSHIP DATA

CROSS-REFERENCE TO RELATED APPLICATION

This application is a divisional patent application and claims the benefit and priority to the U.S. patent application Ser. No. 14/606,990, which was filed on Jan. 27, 2015 and set to issue on Mar. 20, 2018 as U.S. Pat. No. 9,923,852. The U.S. patent application Ser. No. 14/606,990 is a continuation patent application and claims the benefit and priority to the U.S. patent application Ser. No. 13/282,312, which was filed on Oct. 26, 2011, and was issued on Jan. 27, 2015 as U.S. Pat. No. 8,943,151. The U.S. patent application Ser. No. 13/282,312 claims the benefit and priority to the U.S. Provisional Application No. 61/406,973, which was filed on Oct. 26, 2010. The U.S. patent application Ser. Nos. 14/606, 990 and 13/282,312 which is issued as the U.S. Pat. No. 8,943,151 are incorporated herein by reference in their entirety.

FIELD OF THE INVENTION

The invention relates generally to collation and analysis of passively created relationship data and, more particularly, to the determination of relationship strength by analyzing digital communication exchanges.

BACKGROUND OF THE INVENTION

Every organization has a rich network of relationships that are vital to the sales and business development goals of the company, but coordinating and leveraging business networks is challenging. Many companies wish to maximize the potential of their employees' collective contacts, but the logistics of trading and comparing established relationships results in the loss of significant opportunities.

There are many approaches to comparing and leveraging collective contacts. The most basic is the business card or "rolodex" approach—each individual tracks their own relationships and solicits information from others with similar tracking methods. This approach suffers because "others" may not track their business relationships, or even remember their previous contacts. In some cases, "others" may not respond to a solicitation—such as a solicitation via a bulk e-mail request—when there is no readily-apparent personal benefit.

Another approach is to enter each employee's contacts in a searchable database. This is a time-consuming endeavor, requiring the manual input of the detail of each employee's contact. Moreover, this approach answers only "Who knows Person X?" and does not given an indication of how strong the relationship is between Person X and the company or the individual employees.

Electronic professional networks—such as LinkedIn, for example—could be described as a combination of the above approaches. In such networks, individuals enter their own professional details into a profile and "link" that profile to their contacts. The networks are typically based on an invite system—a pair of users are linked when one accepts an invitation from another. These systems fail, however, when a given professional network system not uniformly used and where a large number of professionals do not have the resources to maintain their profiles, accept invites, etc.

Other known approaches are described as "enterprise relationship management platforms," such as Interaction IQ (distributed by LexisNexis) or ContactNet (distributed by Hubbard One/Thomson Reuters). In such networks, users must install software on their network and integrate that software with third party solutions like Customer Relationship Management technology. These systems require onsite installation and a minimum of three data integration points with the system (lightweight direct access protocol, address books, and message tracking logs). Such systems require resources to maintain, manage, and configure the software. Such systems may obtain e-mail communication data from e-mail log files. However, e-mail log files have limited information. Further, these systems fail to provide a data push method when a professional network wants to send data from an archive or spam filtering solution rather than an e-mail exchange system. These systems also fail to provide display names for professional networks because the display name data is not contained in message logs. Another disadvantage of these systems is their limit to the log files of particular software, such as Microsoft Outlook, and their reliance on the business contacts listing of end-users, such as the contacts listing in Microsoft Outlook. These failures limit the capacity of the systems to conveniently and comprehensively track the relevant relationship data.

SUMMARY OF THE INVENTION

Exemplary embodiments of the invention are directed to solving issues relating to one or more of the problems discussed above, as well as providing additional features that will become readily apparent by reference to the following detailed description when taken in conjunction with the accompanying drawings.

In one embodiment, the invention provides a computer readable medium containing executable instructions that when executed perform a method of generating relationship data, including obtaining characteristics of exchanges between users of digital communication system, where the characteristics are stored in an interaction database and wherein the data is obtained through a direct internet access protocol, and generating relationship data by analyzing the characteristics. In a further embodiment, the characteristics are one or more of interaction volume, interaction frequency, interaction type, number of communication participants, and time of first & last interaction. In some embodiments, the interaction database is populated as a result of monitoring exchanges on the digital communication system. In some embodiments, the digital communication system is an e-mail system and a characteristic is the number of e-mail exchanges between at least one pair of users. In other embodiments, a relationship strength of each pair of users is created. In some embodiments, a graphical representation of the strength of relationship is provided.

In one embodiment, a computer readable medium containing executable instructions that when executed perform a method of modeling relationships between a plurality of e-mail users is provided. The method includes extracting a record of e-mail exchanges between the plurality of users, wherein the data is extracted through a direct internet access protocol, filtering the record, and loading the relevant data into a relationship modeling program which provides a model of relationships between the plurality of e-mail users. In some embodiments, the record is extracted from at least one of an e-mail server and an e-mail transfer agent. In some embodiments, the record is filtered to produce relevant interaction data and the relationship modeling program assigns a weight to each of a plurality of characteristics of the relevant interaction data.

DETAILED DESCRIPTION OF EXEMPLARY EMBODIMENTS

Figure 1:
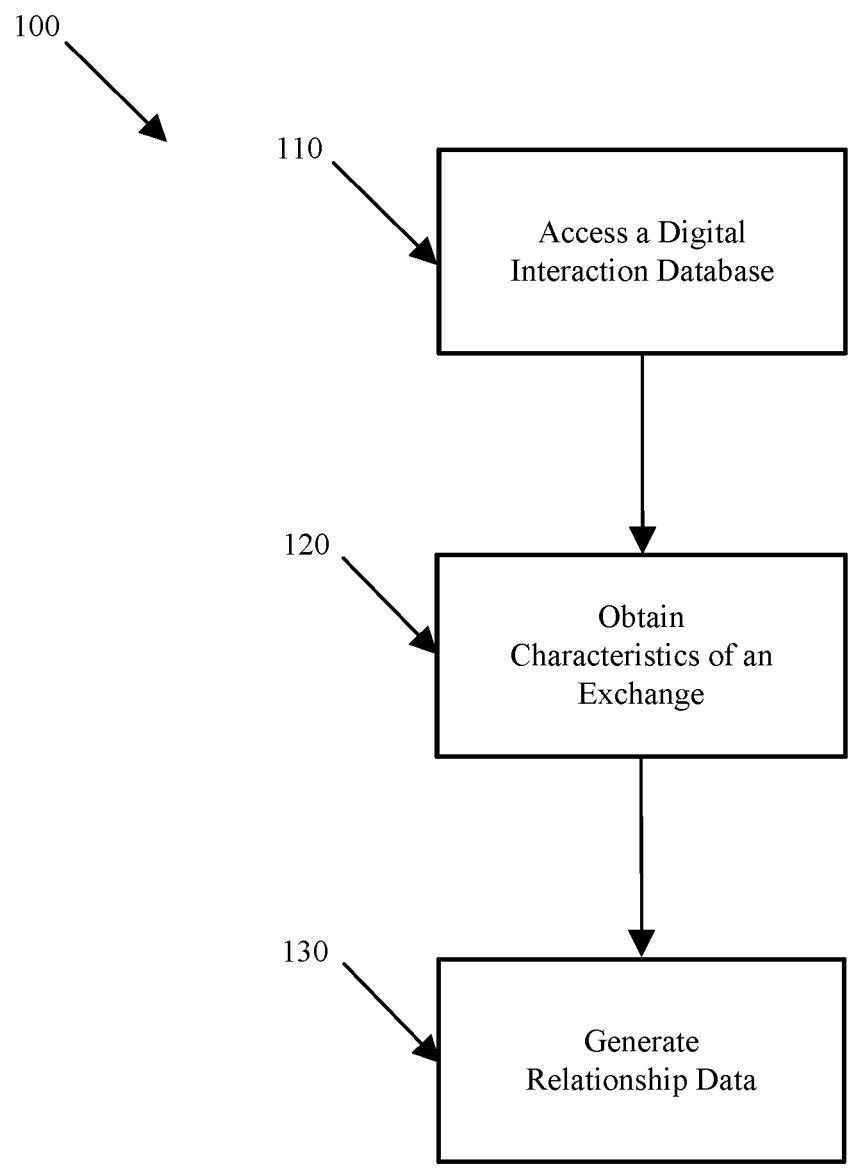
FIG. 1 illustrates a method of generating relationship data, in accordance with an embodiment of the invention.

In the following description of exemplary embodiments, reference is made to the accompanying drawings which form a part hereof, and in which it is shown by way of illustration, specific exemplary embodiments in which the invention can be practiced. It is to be understood that other embodiments can be used and structural changes can be made without departing from the spirit and scope of the invention.

In one embodiment of the invention, passively-created, digital interaction and relationship data is accessed and a network of relationships based on the interaction data is generated. The network is analyzed to create actionable operational information and relationship connections.

In another embodiment, a system for providing relationship and interaction information is provided. The system is based on the automated analysis of client relationships accessed through corporate digital communication mediums and data sources (e.g. E-mail, Calendar, Instant Messaging, VoIP, Phone, SMS). A multi-tenancy database architecture facilitates shared multi-user communication data storage, mining and analysis. Data algorithms are employed to produce statistical and behavioral information on said data to yield insight into client engagement and interaction information. This multi-user statistical data provides collated data for each contact and network such as interaction volume, frequency, interaction type, number of communication participants, time of first & last interaction. Algorithms are employed across this statistical data to yield a broad range of professionally relevant and actionable insight. For example, the above factors are used to produce a linear scale to indicate how close or intimate two entities (e.g., individuals or networks) are. A user interface provides access to the graphical representation of this dynamic statistical information.

In another embodiment, interaction and relationship data is collated, translated, and statistically analyzed to provide a platform for establishing corporate strategies.

Passively created digital databases of relationship interactions may include e-mail exchanges, e-mail archives, phone systems including text messaging systems, calendar appointments, instant messaging, VoIP, phone billing systems, database logs, internet browsing history, communications via any third party platform api (i.e. Twitter, LinkedIn, Skype) and any combination thereof.

In some embodiments, the data includes the name of an e-mail address holder, the domain of a company's e-mail account, average number of communication participants, the pattern of communication (including, for example, the time between interactions, the ratio of source to target versus target to source interactions, the time of day and the day type), the volume of communication, interaction volume, frequency, interaction type, number of communication participants, and time of first & last interaction.

In some embodiments, data is accessed by including a user-controlled system or an automated system. An example of user-controlled mechanisms includes a system that is installed on the user's contact platform (such as an e-mail client plugin, browser plugin or call logger) that accesses the relationship interaction data and automatically gathers and transmits the data to the network server. An example of an automated system is a system that gathers the data from servers (such as e-mail exchange servers). Another mechanism may include a system that utilizes a users service-provider (such as an e-mail provider, cellular provider, IM Host) to provide a method that allows the network server to gather the data on an automated basis from the server-provider system. Yet another example of a user-controlled mechanism may require a user to provide login credentials (such as e-mail login credentials) before the interaction system can access that user's information.

Interaction data is created by mining a record of exchanges over a digital communication system. For example, in one embodiment, a record of exchanges over an e-mail system is mined for interaction data. The exchanges may be reviewed at a user level by, for example, connecting directly to user's mailbox using their credentials (username and password), connecting indirectly to a user's mailbox using a service account (e.g., system administration, or other account with upper level access privileges), connecting directly using "OAuth." OAuth allows users to hand out "tokens" instead of credentials to their data hosted by a given service provider. Each token grants access to a specific site (e.g., an e-mail mailbox) for specific resources (e.g., just contacts for a given mailbox) and for a defined duration (e.g., the next 2 hours). This allows a user to grant a third party site access to their information stored with another service provider, without sharing their access permissions or the full extent of their data. In some embodiments, the exchanges are reviewed using a combination of some or all of the above user level mechanisms.

In other embodiments, the exchanges are reviewed using a mail server, mail archives, or access to a log file. For example, native mail server log files can be imported into a mining system, collated, and transferred into interaction data. The importation can be scheduled on a regular basis or initiated by the system or the client. Another example includes a formatted export, where the system uses queries to extract relevant interaction data from client servers and electronic records.

In yet other embodiments, the exchanges are reviewed using existing spam filtering systems, where the interaction data is based upon the e-mail header in spam filters or their log files. For example, many e-mail exchanges use a third party spam-filtering service (such as Google's "Postini") which intercepts and cleanses e-mails prior to their reaching the e-mail exchange. This may involve customers re-pointing their MX records to a third party spam filtering service provider for all inbound and outbound e-mail exchanges. In some embodiments, data is accessed at this point by partnering with these 'Security-as-a-Service' spam filter providers. In yet other embodiments, the exchanges are reviewed using a "journaling folder." A journaling folder is used on Exchange for archiving purposes and can be setup to duplicate all e-mails received and sent by the user into this folder.

The folder may be located on the end users computer or elsewhere. Just as some archive solutions poll this folder and pull a copy of the e-mail down locally, some embodiments use this resource to populate a database of exchange data. In yet other embodiments, the exchanges are accessed via a plugin in the mail client. In some embodiments, the mail client is a piece of software like Outlook or a web browser for a service like Gmail. In some embodiments, third party databases are mined for relevant interaction data. Such third party databases may include an e-Discovery or CRM system. In other embodiments, personal communication systems—such as mobile/cellular telephones and personal data assistants—may be mined for relevant interaction data. In other embodiments, networks or e-mail servers are directly monitored for relevant exchanges.

One or more of the above discussed methods of gathering interaction data may be utilized to populate a database with relevant interaction data. The data may be then transferred into a different structure or format, before it is imported into a program for generating relationship data.

In some embodiments, the digital interaction data define a relationship between individuals or companies based on being included on an interaction. The relationships need not to be mutually defined.

In some embodiments, a user may be able to discontinue participation in the collation and creation of relationship data, including for all or some relationships.

According to one aspect of the invention, a network can measure the time that has been invested in building and maintaining relationships with contacts and companies. The network system analyses the digital interactions between the network and the contacts & companies. It can then associate a variable time value for each inbound interactions (such as 76 seconds to read an e-mail and an additional 64 seconds distraction time from the interaction) and associates another variable time value for outbound interactions based on type (such as time to dial a number & wait for the call to be answered, or the average time to write a business e-mail). These times are can then be grouped by a date time range at either a contact or company level. The data can also be analyzed at an individual user level, user group level or entire network level.

According to another aspect of the invention, a network can measure the amount of money that has been invested in building and maintaining relationships with contacts and companies. The network system analyses the time incurred by the creation, distribution and consumption of each interaction (such as average time to write an e-mail, length of a phone call) and computes the value of each user's interactions using either their individual hourly rates or an average figure. This data can be grouped at a company level and can be analyzed at an individual user level, user group level or entire network level.

Examples of analyzing the interaction network include identifying the strength of relationship within the users of a network to an external contact, contacts, company, or companies. The strength of the relationship interaction can be used to inform sales performance strategies, marketing strategies, CRM Strategies, monitor client relationships, succession planning strategies, reward and remuneration planning, risk monitoring, career development planning etc.

FIG. 1 is a block diagram of a process 100 of generating relationship data, in accordance with an embodiment of the invention. It should be appreciated that process 100 may include any number of additional or alternative tasks. The tasks shown in FIG. 1 need not be performed in the illustrated order, and process 100 may be incorporated into a more comprehensive procedure or process having additional functionality not described in detail herein.

As shown in FIG. 1, process 100 includes accessing 110 a digital interaction database, obtaining 110 characteristics of an exchange of information from the digital interaction database, and generating 120 relationship data. The digital interaction data base referred to step 110 may include a record of exchanges between two or more users of a digital communication system, including one or more of the digital communication systems described herein. Further, the relationship data generated in step 120 may include analyzing one or more characteristics of the exchange information obtained in step 110, including one or more of the characteristics described herein.

Described next is an exemplary embodiment of an e-mail-based digital interaction and relationship data. The system may provide a mechanism where individual e-mail account interactions can be connected/merged together into one mega-collection network of shared contacts and interactions. Individual E-mail accounts are connected together to give insight into the collective contacts and interactions of the "network." If User A e-mails contact X then User B and other users of the network will be able to see that user A is connected to contact X along with a summary of the interaction history between both User and contact.

In some embodiments, the data gathered from the interactions includes the "To," "From," "CC," "Bcc," "Date," "Time," "Subject," of an e-mail "envelope."

In some embodiments, the data gathered from the interactions includes the "text length" (the number of characters of the body of the e-mail), the "folder" (the name of the folder where the message is stored on the user's mailbox), and "InReplyTo" (the message ID of any previous mail to which this is the reply).

In other embodiments, the data gathered may include any field listed in e-mail format specification RFC 2822, the disclosure of which is incorporated by reference herein in its entirety. In yet other embodiments, the data gathered may include any field listed in SMTP, IMAP4, POP3, MIME, RFC 2046, RFC 3156, or RFC 5322, the entireties of which are incorporated by reference herein in their entireties. In some embodiments, the data gathered may include fields listed in multiple of the foregoing references.

In other embodiments, the data is gathered from telephone interaction data, including numbers received, numbers dialed, numbers texted, start time of calls, end time of calls, duration of calls, time of day of call, amount of data exchanged, cost of a call, etc.

In other embodiments, data is gathered from calendar records (such as Outlook Calendar), including organizer, invitees, start time and date, end time and date, location, subject/title, accepted/rejected status of attendees, etc.

In other embodiments, data is gathered from instant message records, including from, to, date/time of each entry, length of conversation, frequency of conversations, etc.

In some embodiments, data is gathered from one or more of the above sources.

In some embodiments, the e-mail user logins into the network and provides the required e-mail credentials for the system to access the users e-mail repository. This e-mail repository may refer to any store of e-mail data that can be accessed by the network. Examples include e-mail accounts on e-mail servers, e-mail account archives or e-mail header log files.

To update data, the system may connect to the users e-mail repository on a scheduled basis using the user credentials and extract each e-mail from the e-mail repository.

The system may take the information in each e-mail it processes to identify new connections and update existing connections between contacts and companies on each e-mail. The unique ID for a Contact may be extracted from each individual e-mail address of the e-mail. Additional information on the date and direction (From, To, CC, BCC) of the interaction taken from each e-mail.

Figure 2:
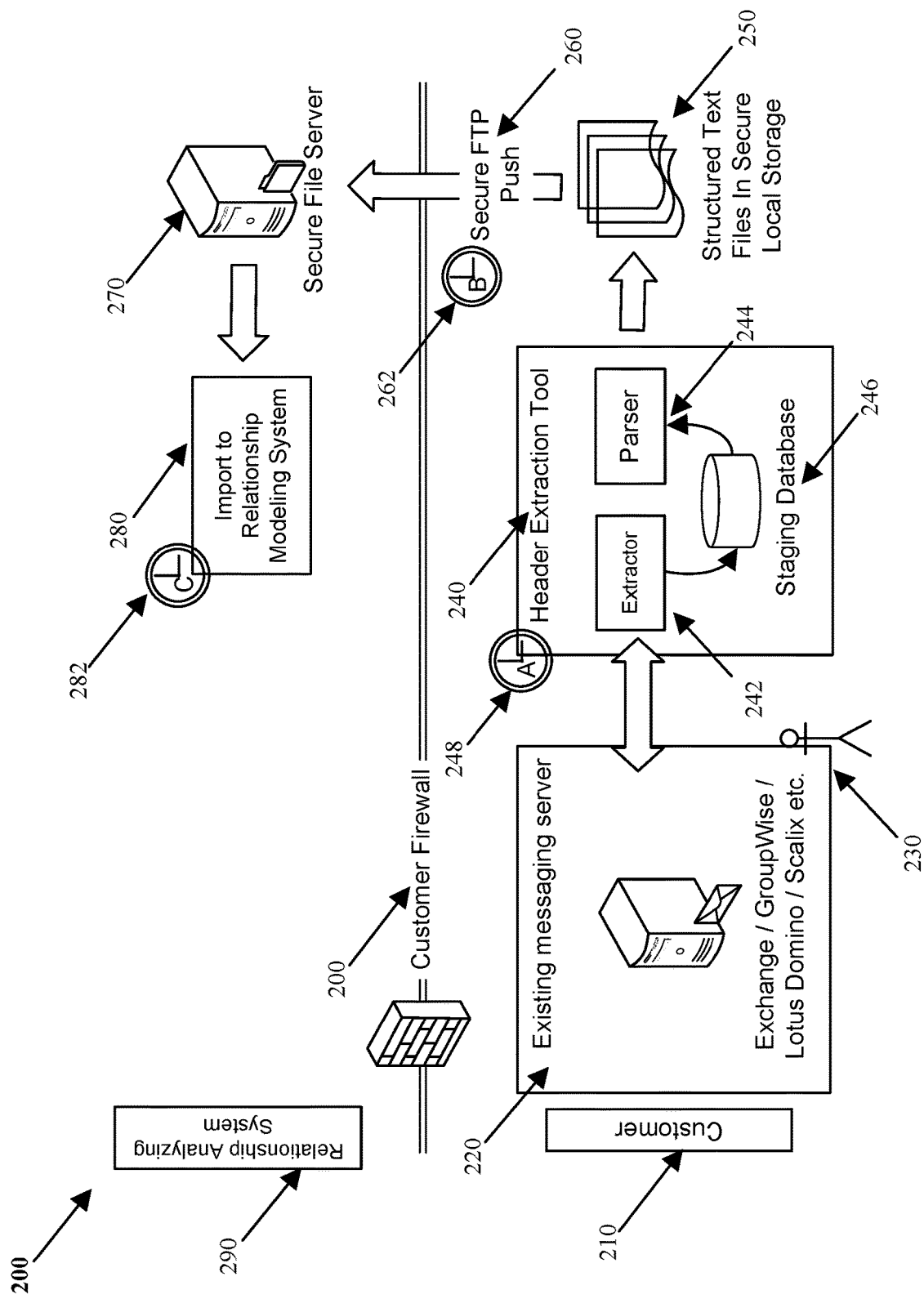
FIG. 2 illustrates a flow diagram of a method of a customer "push" of relationship data to an external relationship analyzing system, in accordance with an embodiment of the invention.

In some embodiments, a customer "pushes" relationship data to a relationship analyzing system which is external to the customer's firewall. FIG. 2 illustrates a flow diagram for a system 200 where a customer 210 pushes data to a relationship analyzing system 290 that is external to the customer's firewall 212. Customer 210 could be an individual, a company, or a combination of individuals and companies.

In system 200 of FIG. 2, the customer accesses and processes all relationship data locally and sends only preagreed relationship data in a precise format to external processing server. The system begins with an existing messaging server 220 is mined by a header extraction tool 240. The messaging server 220 is mined by a migrator user 230 of the header extraction tool 240, which reads from each user in the server mailbox. The header extraction tool 240 comprises an extractor 242, a parser 244, a staging database 246, and a clock 248. Once processed by the header extraction tool 240, the relationship data is stored locally in structured text files 250. The structure text files are then pushed 260 to a secure file server 270, where the relationship modeling system 280 extracts the information.

The extractor 242 of the header extraction tool 240 uses the migratory user 230 account to access each mailbox (belonging to a particular, configurable list of users) on the messaging server 220. It extracts the entirety of each message to a local temporary database.

The staging database 246 is a database separate from any pre-existing database solution. This database requires no access outside of the customer security domain. The database is truncated upon successful parsing in order to preserve storage space.

The parser 244 is a simple script which will parse from the database 246 the precise details required. This creates the structured text files in local storage which will be later transferred in a separate process, described below.

The header extraction tool 240 includes a clock 248. The clock may be scheduled to run on any frequency, such as daily, and only retrieve and store information for the previous period (e.g., one day), and also to cover rare occasions when no run was possible due to system downtime, etc.

The structured text files 250 may be simple text files with a precisely defined structure. Multiple files may be used in order to ease file handling and subsequent transfer via SFTP e.g. each file may be limited to 100 MB size.

The secure ftp push 260 is the first time any data leaves the customer security domain. A service running on a customer server will securely transfer the structured text files to an external file server on a predefined schedule (Clock 262). The same service will routinely clear out past text files which have been successfully transferred.

The secure file server 270 may not be part of the system which calculates relationships etc. and will allow Secure FTP (FTP over SSH) access only to Customers and only to specific designated folders for each Customer. No Customer will be able to access any folders or files belonging to anyone else.

Relationship modeling system 280 receives the data from the structured text files on a regular basis (Clock 282).

Although the description of FIG. 2 above refers to particular mechanisms to achieve certain functions in system 200, alternative mechanisms could be used consistent with the disclosure herein. For example, the migratory user 230 could be replaced by any of the data extraction tools described herein. Similarly, other aspects of system 200 could be removed or replaced without deviating from the scope of the invention.

In some embodiments, the system tracks the total number of interactions between each e-mail address pair (i.e. between a@123.com and b@789.com), between each e-mail address and e-mail domain pair (i.e. a@123.com and 789.com) and between each e-mail domain pair (i.e. 123.com and 789.com). The system records the first interaction date, the last interaction date, the number of e-mails from the source to the target, the number of e-mails from the target to the source and the number of e-mails from neither the source or the target (indirect e-mails).

A user may search the network by entering the contact or company name. The system may return a list of search results that match or are similar to that name from all the user data in the network. This data is derived from one or more of the network users having ever e-mailed a company or individual that has a name or domain name like the search term. In the case of companies the name is compared against all of the unique domain names contained in all of the e-mail addresses contained in the network (i.e. the part of the e-mail address that is after the @ character). In the case of contacts the name is compared against the unique e-mail address or the identifier data that is to the left of the @ character (i.e. mary.roche if the e-mail address was mary.roche@companyABC.com). The e-mail address display name field is also searched when looking for a contact based on their name (i.e. "Mary Rocher"<mary.roche@companyABC.com>

The system may allow the user to view contacts grouped by company (i.e. see all the contacts who have an e-mail address at the same company i.e. companyABC.com). In some embodiments, the system allows the user to view what other external contacts a contact has at the same company. In further embodiments, the system allows the user to see the earliest e-mail date between the network and the contact/company. The system may allow the user to see the most recent e-mail date between the network and the contact/company. In yet further embodiments, the system allows users to view the summary data of all interactions between the network and the contact or company for a given date range. This data may be presented in tabular format or visually in a chart. The data may show interactions from the network, from the contact/company and from other 3rd parties. The user may be able to adjust the date range and the data refreshes.

The strength of a relationship can be determined based on a number of factors. This relationship score may be calculated using a combination of several interaction statistics. Such options may include, for example, the volume of communications, the intimacy of the conversation, the frequency of the communications, the timing and day types of the communications and the historical age of the relationship.

In some embodiments, an end user's or a company's contact data is provided in a weekly or other periodic report. The report may include a summary of connections for that period and/or connections in total. The report may further include one or more of a list of the most contacted individuals or companies for the period ("most" can be set to a user preference, such as "top 5" for example), new individuals or companies contacted in the period, and connections which faded in the period (such as contacts which have not received a communication from the user during the period). In some other embodiments, an end user's or a company's contact with a given individual or company is reported as a function of time and may be presented graphically. In further embodiments, the "activity status" of the connection may be included (activity status is an indication of the strength of the relationship and may include, for example, "active," "fading, "cold," or inactive"—the number of statuses and criteria for each being variable to suit individual needs). In still further embodiments, the report may focus on just one activity status, such as "fading" contacts.

A user may filter interactions by a date range. A user may also filter the results to only include a subset of interactions that are related to a specific user or group of users. A user may generate a report of what contacts or companies have had no interactions with any user in the network since a given amount of time from the current date (i.e. 30 days, 3 months, 1 year). A user may generate a report of contacts or companies that have first interacted with any user in the network (i.e. new contacts or companies) since a given amount of time from the current date (i.e. 30 days, 3 months, 1 year). A user may generate a report of contacts at a company that have first interacted with any user in the network (i.e., new contacts or companies) since a given amount of time from the current date (i.e. 30 days, 3 months, 1 year).

According to one aspect of the invention, the invention answers "who knows who" and "how well they know them" using the data in e-mails. The invention may solve a problem they faces user every day—"Who do we know at Company ABC?" Despite having a global CRM system, LinkedIn and other research tools, the problem may be difficult to solve. The invention solves this problem. For example, if a corporation is selling a product to Company ABC. A user may type Company ABC into the search bar and immediately see which of her colleagues has relationships there. These results are sortable by the strength, depth and quality of their relationships. The invention may rank the relationships. This rank may be automatically calculated based on who is e-mailing who, how often they interact and who else shares these contacts.

In some embodiments, the above advantageous results can also be achieved by asking "Who in our company knows Person X?" etc. Further, embodiments of the invention may answer "How well to we know Person X?" or "How well to we know employees at Company ABC?"

In some embodiments, the network may be analyzed to discover trends, monitor growth and/or decay at specific nodes, and grouping by inner and outer circles.

Attached hereto, and forming a part hereof, are four exhibits of exemplary embodiments illustrating certain aspects of the invention. These exhibits include "DataHug helps companies understand 'Who Knows Who,'" "Learn More About DataHug," "DataHug Business Use Case Matrix," (2 pages) and "CRM Pulse—Connecting the Dots."

Figure 3:
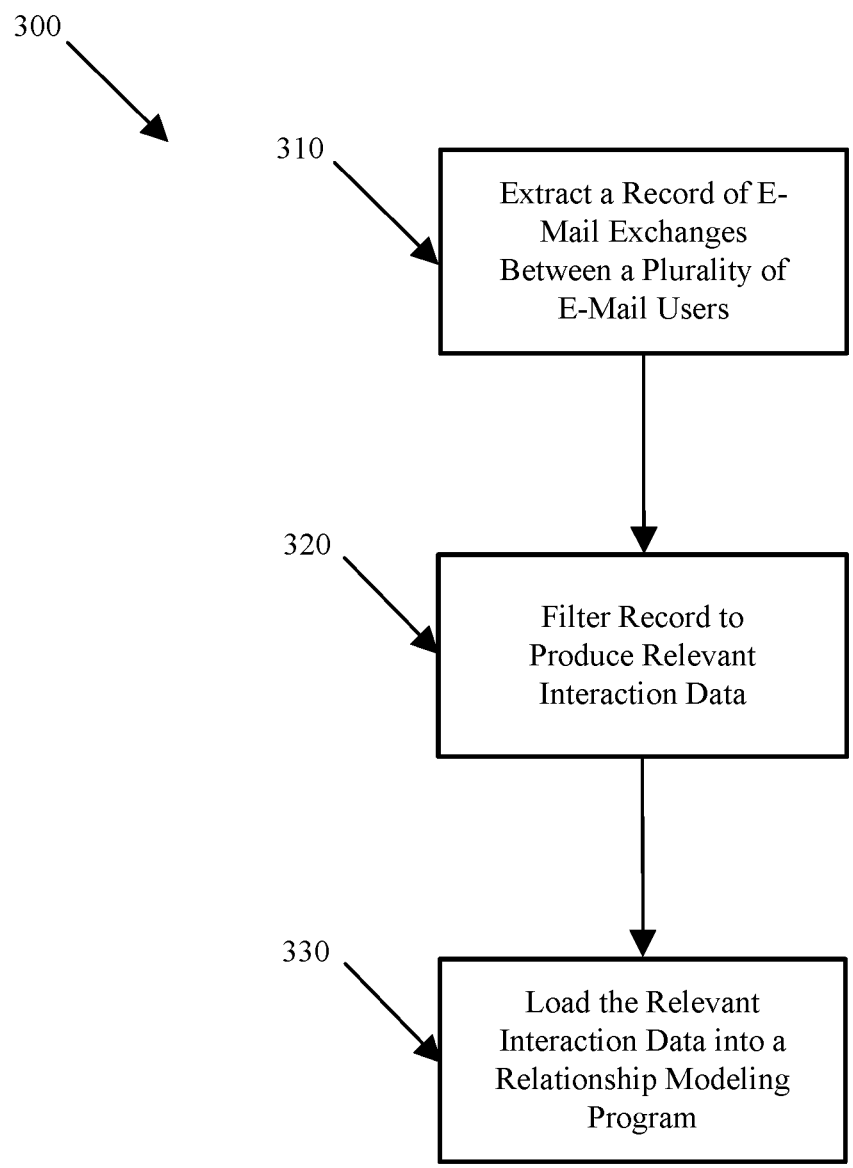
FIG. 3 illustrates a method of modeling relationships between a plurality of e-mail users, in accordance with an embodiment of the invention.

FIG. 3 is a block flow diagram of a process 300 of modeling relationships between a plurality of e-mail users, in accordance with an embodiment of the invention. The method includes extracting 310 a record of e-mail exchanges between the plurality of users, wherein the record is extracted from at least one of an e-mail server and an e-mail transfer agent. In some embodiments, the record may be extracted from software or hardware participating in any link of an e-mail transfer chain. The record is filtered 320 to produce relevant interaction data. The relevant interaction data is loaded 330 into a relationship modeling program, wherein the relationship modeling program assigns a weight to each of a plurality of characteristics of the relevant interaction data, and wherein the relationship modeling program provides a model of relationships between the plurality of e-mail users based at least in part on the weight of each of the plurality of characteristics.

Another aspect of the invention includes a method comprising the automated interrogation and translation of summary and statistical data from the envelope of business communications to develop a business-wide statistical model and relationship ranking graph. The method further comprises leveraging the multi-tenant data architecture to facilitate the cross-user communication data collation and statistical analysis. The method further comprises the ability to represent external client interaction information based on identifiable characteristics that associate an individual entity with a client corporate entity. The method further comprises data mining, data aggregation and statistical filtering of said communication data to yield relationship insight of contacts and networks. The HugRank algorithm leverages communication statistical data such as average number of communication participants and patterns of communication to establish a linear scale to demonstrate how close two entities are. The linear HugRank score is derived from multiple logarithmic components to mitigate outliers or false positives. In another aspect, the business application of the method above may provide corporations with the unique ability to find and identify wider contacts or networks connected through their employees' corporate communications and then provide actionable relationship insight to guide operational decisions.

In some embodiments, the ranking system may apportion weights to one or more of the following parameters: date of first interaction; date of last interaction; volume of interactions; frequency of interaction; speed of reply; ratio of interaction (from them/from us); Day Types (work days, weekends, holidays); participant count on interactions. (1 to 1, 1 to many—the participation weight of the e-mail is 1/number of participants); time of day (work hours, non-office hours); interaction type (e-mail, mail, calendar, phone); interaction length (duration of call, duration of meeting, etc. . . . ); attachment types and counts (images, PDFs, excel etc. . . . ); domain of e-mail (personal, educational, company); multiple interaction addresses; the number of e-mail addresses, numbers etc, associated with a contact; country of e-mail domain or phone number; circle size (number of other common contacts); circle weight (average hugrank of circle); manual relationship classification (i.e. friend, classmate, private, client etc.); classification of company based on internet domain; admin weighting (admins may be able to tweak interaction weightings); percentage of overall interaction with contact (the ratio of volume or direction of contacts between a given person and all persons contacted); and position of contacts (for example, apportioning more weight to contacts from chief-executives, or personnel who are to known to have little time for or access to e-mail). The weighting may be equally distributed or may be apportioned to account for relevant characteristics of high-potential interactions.

In some embodiments, an invitation system is accessible to all users of the system. The invitation system allows an end-user to invite others within a particular domain or within the end-user's connections. In further embodiments, the invite system may list for the end-user the strongest connections not within the system. Once invited, the end-users can compare contacts and leverage their collective relationships.

Among others, the embodiments discussed herein advantageously provide companies and/or individuals with prospecting (understanding who at a company has the strongest relationship with potential prospects), account management (tracking interaction levels and identifying key relationship owners), and risk management (maintaining historical relationships after colleagues leave the company). Other advantages to embodiments discussed herein are known and contemplated.

Although embodiments of the invention may be described and illustrated herein in terms of e-mail systems, it should be understood that embodiments of this invention are not so limited, but may also be applicable to other digitally based interaction and relationship data, such as telephone systems, for example.

It is noted that various features have been discussed throughout this specification. In any embodiment, they may be present individually or in any combination with any of the other aspects of the device.

It will be understood that the foregoing is only illustrative of the principles of the invention, and that various modifications, alterations, and combinations can be made by those skilled in the art without departing from the scope and spirit of the invention. Any of the embodiments disclosed herein can include features described by any other embodiment or combination of embodiments herein. Accordingly, it is not intended that the invention be limited. For all of the embodiments described above, the steps of the methods need not be performed sequentially.

While various embodiments of the invention have been described above, it should be understood that they have been presented by way of example only, and not by way of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described. They instead can, be applied, alone or in some combination, to one or more of the other embodiments of the invention, whether or not such embodiments are described, and whether or not such features are presented as being a part of a described embodiment. Thus the breadth and scope of the invention should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

What is claimed is:

1. A non-transitory computer readable medium containing executable instructions that when executed perform a method of modeling relationships between a plurality of e-mail users comprising:
    extracting a record of e-mail exchanges between the plurality of users, wherein the record is extracted from a database of e-mail exchanges between pairs of users, wherein the data is extracted through a direct internet access protocol;
    filtering the record to produce relevant interaction data based on the e-mail exchanges between the plurality of users, wherein the relevant interaction data includes a number of e-mail exchanges between each pair of the plurality of users;
    loading the relevant interaction data into a relationship modeling program, wherein the relationship modeling program assigns a weight to each of a plurality of characteristics of the relevant interaction data for each pair of the plurality of users, the plurality of characteristics comprising a time since a first interaction, a time since a last interaction, interaction volume between the two users, and a ratio of source to target versus target to source interactions, wherein the plurality of characteristics are further associated with at least one other digital communication medium selected from a group consisting of calendar, instant messaging, SMS, and phone, wherein the relationship modeling program provides a model of relationships between each pair of the plurality of e-mail users by determining a relationship strength between each pair of the plurality of e-mail users based at least in part on the weight assigned to each of the plurality of characteristics; and
    displaying the model of relationships on a user interface.

2. The non-transitory computer readable medium of claim 1 further comprising populating an interaction database by monitoring e-mail exchanges and extracting relevant e-mail exchanges.

3. The non-transitory computer readable medium of claim 1, wherein a characteristic of the plurality of characteristics is selected from a group consisting of interaction frequency, interaction type, number of communication participants.

4. The non-transitory computer readable medium of claim 1, wherein the plurality of characteristics comprises a time between interactions.

5. The non-transitory computer readable medium of claim 1, wherein the data associated with the e-mail exchanges between the plurality of users is obtained from an e-mail field selected from a group consisting of SMTP, IMAP4, POP3, MIME, RFC 2046, RFC 2822, RFC 3156, and RFC 5322.

6. The non-transitory computer readable medium of claim 1, wherein the data associated with the e-mail exchanges between the plurality of users of the e-mail system is obtained from a mail server, mail archives, and a log file.

7. The non-transitory computer readable medium of claim 1, wherein the data associated with the e-mail exchanges between the plurality of users of the e-mail system is obtained from a spam filtering system based e-mail headers.

8. The non-transitory computer readable medium of claim 1, wherein the model of relationship includes strength of the relationship based on intimacy of conversations, frequency of communications, and historical age of the relationship.

9. The non-transitory computer readable medium of claim 1, wherein the interaction data is further associated with at least one other digital communication medium selected from a group consisting of calendar, instant messaging, SMS, and phone.

10. A method of processing relationship data in a server, the method comprising:
    receiving, at the server, data comprising a plurality of characteristics of e-mail exchanges between pairs of users of an e-mail system, wherein the data is transferred to the server from an interaction database of e-mail exchanges between pairs of users of the email system, and wherein the interaction database is populated through a direct internet access protocol, wherein the plurality of characteristics comprise a time since a first interaction, a time since a last interaction, interaction volume between the pair of users, and a ratio of source to target versus target to source interactions, and the plurality of characteristics are further associated with at least one other digital communication medium selected from a group consisting of calendar, instant messaging, SMS, and phone;
    assigning a weight to each of the plurality of characteristics for each pair of users;
    transferring, from the server, the data to a processor for generating relationship data by determining a relationship strength associated with each pair of users; and
    displaying the relationship data on a user interface.

11. The method of claim 10, wherein the displaying of the relationship data on the user interface comprises providing a graphical representation of the relationship strength associated with each pair of.

12. The method of claim 10, wherein the interaction database is populated by monitoring e-mail exchanges and extracting relevant e-mail exchanges.

13. The method of claim 10, wherein the characteristic comprises at least one selected from a group consisting of interaction frequency, interaction type, and number of communication participants.

14. The method of claim 10, wherein the characteristic comprises a time between interactions.

15. The method of claim 10, wherein the data associated with the e-mail exchanges between the pairs of users of the e-mail system is obtained from an e-mail field selected from a group consisting of SMTP, IMAP4, POP3, MIME, RFC 2046, RFC 2822, RFC 3156, and RFC 5322.

16. The method of claim 10, wherein the data associated with the e-mail exchanges between the pairs of users of the e-mail system is obtained from a mail server, mail archives, and a log file.

17. The method of claim 10, wherein the data associated with the e-mail exchanges between the pairs of users of the e-mail system is obtained from a spam filtering system based e-mail headers.

18. The method of claim 10, wherein the strength of the relationship is based on intimacy of conversations, frequency of communications, and historical age of the relationship.

19. The method of claim 10, wherein the characteristic of e-mail exchanges between pairs of users is further associated with at least one other digital communication medium selected from a group consisting of calendar, instant messaging, SMS, and phone.

20. A non-transitory computer readable medium containing executable instructions that when executed perform a method of generating relationship data, comprising:

accessing an interaction database of e-mail exchanges between pairs of users of an e-mail system;

obtaining a plurality of characteristics of e-mail exchanges between the pairs of users and wherein the plurality of characteristics of e-mail exchanges fare further associated with at least one other digital communication medium selected from a group consisting of calendar, instant messaging, SMS, and phone, wherein the plurality of characteristics are stored in the interaction database and wherein the data is obtained through a direct internet access protocol, wherein the plurality of characteristics comprise a time since a first interaction, a time since a last interaction, interaction volume between the pair of users, and a ratio of source to target versus target to source interactions;

assigning a weight to each of the plurality of characteristics for each pair of users;

generating relationship data by determining a relationship strength of associated with each pair of users based on the weight assigned to each of the plurality of characteristics for each pair of users; and displaying the relationship data on a user interface.

21. A system for processing relationship data, the system comprising:

an e-mail system;

an interaction database of e-mail exchanges between pairs of users of the e-mail system;

a server to:
  receive data comprising a plurality of characteristics of e-mail exchanges between pairs of users of the e-mail system, wherein the data is transferred to the server from the interaction database, and wherein the interaction database is populated through a direct internet access protocol, wherein the plurality of characteristics comprise a time since a first interaction, a time since a last interaction, interaction volume between the pair of users, and a ratio of source to target versus target to source interactions, and the plurality of characteristics are further associated with at least one other digital communication medium selected from a group consisting of calendar, instant messaging, SMS, and phone;

assign a weight to each of the plurality of characteristics for each pair of users; and transfer the data to a processor for generating relationship data by determining a relationship strength associated with each pair of users; and a user interface to display the relationship data.

* * * * *